United States Patent Office 3,434,269
Patented Mar. 25, 1969

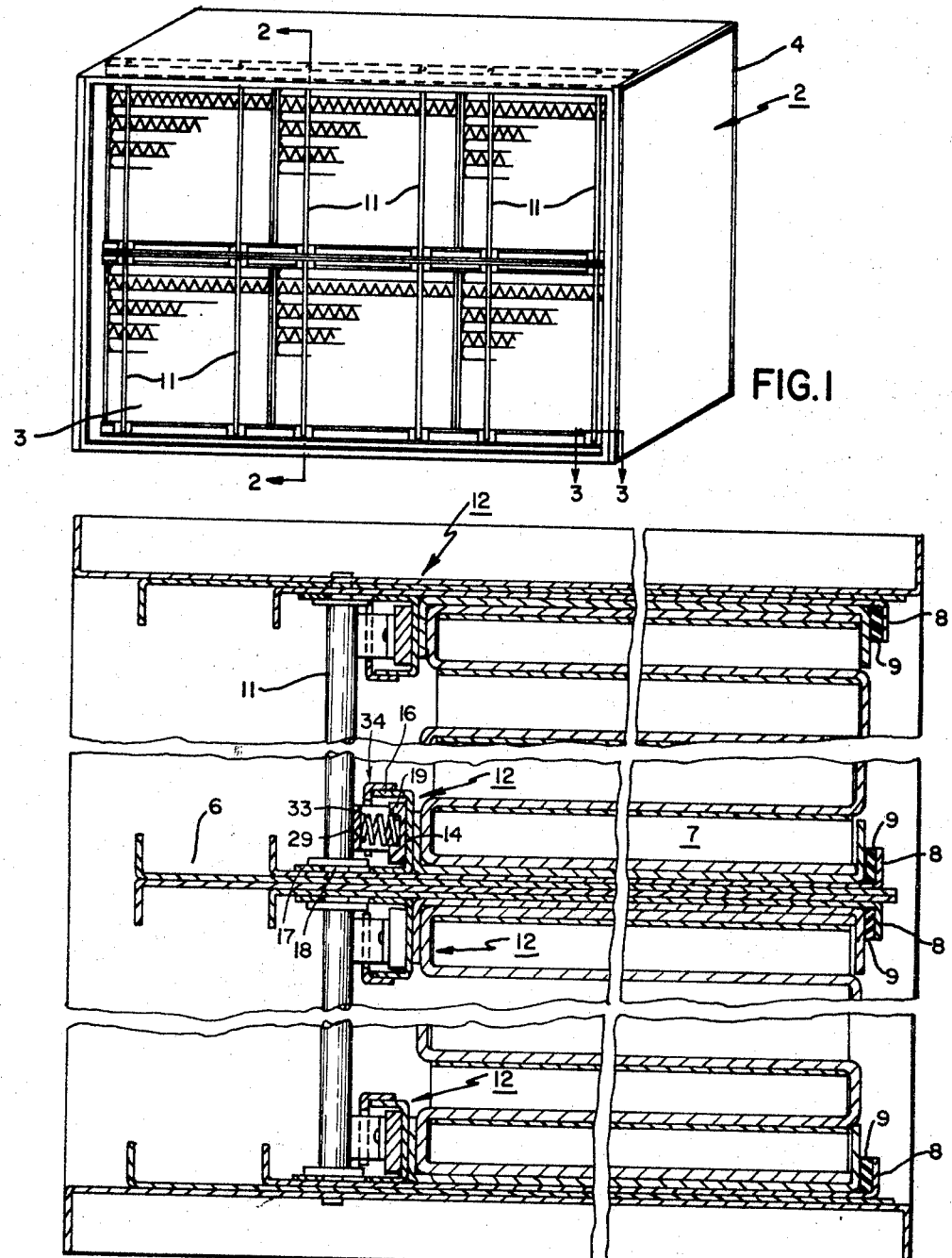

3,434,269
FILTER CELL RETAINING APPARATUS
Philip L. Hyatt, Prospect, Ky., assignor to American Air Filter Company, Inc., Louisville, Ky., a corporation of Delaware
Filed Aug. 9, 1967, Ser. No. 659,362
Int. Cl. B01d 46/12
U.S. Cl. 55—490                    5 Claims

ABSTRACT OF THE DISCLOSURE

A retaining apparatus for retaining a filter cell in sealed position against a peripheral seal on a cell support housing including an expansible-compressible retaining bar assembly positioned between a stop member and an adjacent edge of the filter cell to urge the cell into fast engagement with its seal.

Background of the invention

The present invention pertains to an improved apparatus for gas separation, and more particularly, to a new, useful, and unobvious arrangement for fast securing a filter cell in a filter cell support frame.

A number of filter cell retaining arrangements are known in the art of gas filtration to secure filter cells in sealed relation to their support frame structures. These past arrangements have included individual screw-down mechanisms, compressible springs which slidably press directly against the cell frames, and wedge devices which also slidably press directly against the frames.

Summary of the invention

The present invention, recognizing that these past arrangements have presented problems in construction, cell installation, sealing, wear, and gas stream obstruction, provides a filter cell retaining assembly which is straightforward and economical to manufacture and install, occupying a minimum of space, and requiring a minimum of steps to operate. In addition, the apparatus of the present invention readily accommodates for variations which might occur in manufacture to obtain a substantially positive, uniform, and controlled pressure against the cell frame with which it cooperates. Further, the present invention provides a filter cell retaining arrangement which avoids pressure overload and cell wearing sliding friction.

Various other features of the present invention will become obvious to one skilled in the art upon reading the disclosure set forth hereinafter.

More particularly, the present invention provides, in a flow-through filter cell housing adapted to receive and support unit filter cell means between the dirty gas inlet and clean gas outlet thereof with a peripheral edge of the filter cell means abutting against a peripheral seal on the support housing, an improved filter cell retaining means comprising: stop means mounted on the support housing in spaced relation from a peripheral edge of the space to be occupied by a filter cell means; longitudinally extending fastening means positioned between the stop means and the space for the filter cell means, the fastening means being expansible-compressible in a lateral direction; and means to actuate the fastening means to urge a longitudinally extending side thereof against an adjacent peripheral edge of an inserted filter cell to hold such cell in fast sealed relation against the peripheral seal on the support housing.

It is to be understood that various changes can be made in the arrangement, form, and construction of the apparatus disclosed herein by one skilled in the art without departing from the scope or spirit of the present invention.

Referring to the drawings which disclose one advantageous embodiment of the present invention:

FIGURE 1 is an isometric view of an over-all support frame and filter cell arrangement, incorporating the features of the present invention;

FIGURE 2 is an enlarged, partially broken away sectional view of the apparatus of FIGURE 1, taken in a plane passing through line 2—2 of FIGURE 1;

Figure 3:
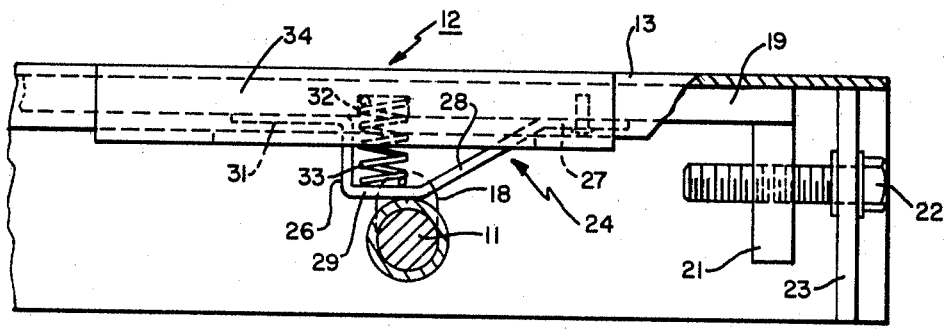
FIGURE 3 is a further enlarged sectional view of a portion of the fastening assembly taken in a plane passing through line 3—3 of FIGURE 1.

Referring to FIGURES 1 and 2 of the drawing, there is disclosed flow-through filter cell support housing 2 having dirty gas inlet 3 and clean gas outlet 4. Housing 2, as disclosed, is rectangular in shape and is formed from spaced opposed vertically extending side panel members between which are fastened in vertically spaced relation from each other several corresponding sets of horizontally extending flanged panel members, the members of each of the sets being of different length so that the flanges thereof provide channel 6 for snug insertion of secondary filter cells and channel 7 (FIGURE 2) for loose insertion of the main filter cells, which, for example, can be of the high efficiency pleated media type utilizing corrugated spacers between the pleats, the units being contained in rigid cell frames. As will be described more fully hereinafter, corresponding edges of the main filter cells are positioned adjacent the peripheral flanges 8 of the channel 7. These peripheral flanges are provided with sealing gaskets 9 of some suitable sealing material such as rubber or asbestos. In this connection, it is to be noted that at least one of the vertically extending side panels can be removed to permit side-by-side insertion of the filter cells. Although, in the embodiment disclosed, a two-high rectangular support housing is set forth, it is to be understood that the features of the present invention can be incorporated in other support housing configurations of various sizes.

To enhance the structural stability of housing 2, permitting removal of the side wall for insertion of the filter cells and to serve as a stop and guide member for fastening assemblies 12 described hereinafter, a set of vertically extending spaced support and stop rods 11 are provided in housing 2. Rods 11 are mounted in housing 2 within channel 7 in preselected position to be in spaced relation from the peripheral edges of the main filter cells inserted in channel 7.

Positioned in the space formed between the rods 11 and that portion of channel 7 which receives the main filter cells is a longitudinally extending fastening assembly 12. As described more fully hereinafter, fastening assembly 12 is expansible-compressible in a direction lateral to the longitudinal axis thereof, so that when it is actuated toward its expanded position, the stop rods 11 limit the movement of one side thereof and the opposite side abuts against the adjacent peripheral edges of the inserted side-by-side main filter cells to hold such cells in fast sealed relation against the peripheral seals 9 of support housing 2.

Figure 4:
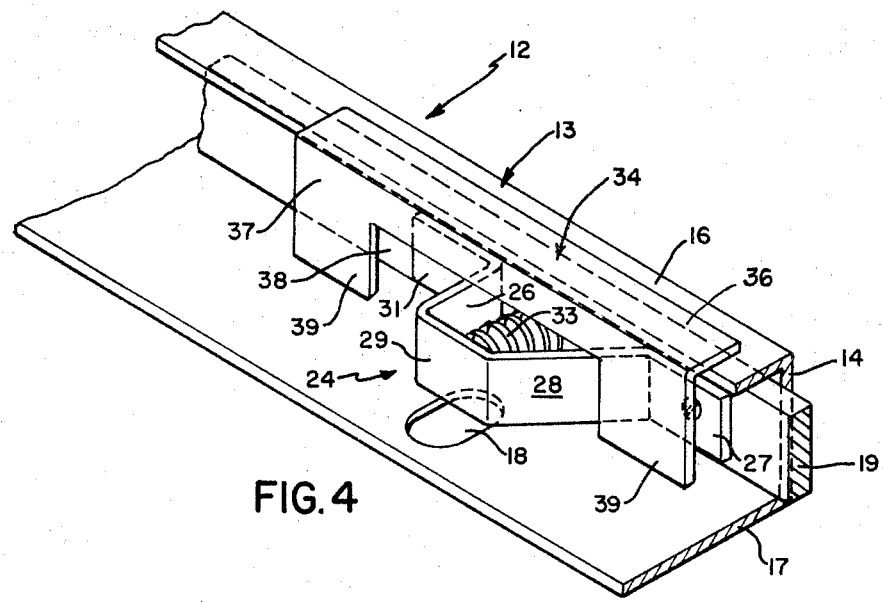
FIGURE 4 is an isometric view of a portion of the fastening assembly of FIGURE 3.

Referring to FIGURES 3 and 4 of the drawings, it can be seen that fastening assemblies 12 each includes a longitudinally extending bar member 13 of U-shaped cross section, having a base side 14 which in turn has extending therefrom in spaced opposed parallel relationship a short side 16 and a long side 17. Side 17 is provided with a plurality of transverse longitudinally extending slots 18, slots 18 being selectively spaced to permit sliding passage of spaced rods 11 therethrough, so as to allow bar member 13 to be moved in a direction transverse its longitudinal axis. Nesting within bar 13 is a second longitudinally extending bar 19 of rectangular cross section. Bar 19 is provided at one end thereof with a transverse arm 21 tapped to receive actuating screw 22 mounted on transverse arm 23 which is fastened to bar 13 in spaced parallel relationship to transverse arm 21. With this arrangement, by turning screw 22, it is possible to slidably move bar 19 in a direction parallel to the longitudinal axis of bar 13. Fastened to bar 19 at spaced select positions thereof to cooperate with spaced vertical rods 11 are expansible-compressible cam members broadly designated by reference numeral 24. Each cam member 24 includes a flexible track 26 having a base section 27, an inclined ramp section 28, dwell section 29, and tongue section 31. Base section 27 is fastened by some suitable means such as riveting to bar 19, while tongue section 31 floats freely in cantilever fashion from the bar. Nesting in an aperture 32 of bar 19 provided adjacent the area to which base section 27 is fastened, is one end of helical coil spring 33, the other end of such spring abutting against the dwell section 29 of track 26. To restrain tongue section 31 of the track section when in operative position, and to limit the amount of lateral movement of bar 19, a detent bar 34 of L-shaped cross section including sides 36 and 37 is provided, side 36 of such bar being fastened to short side 16 of bar 13, and side 37 extending in spaced parallel relation to base side 14 of bar 13. Side 37 it will be noted is provided with a slot 38 through which the ramp section 28 and dwell section 29 extend so as to engage with rods 11. On either side of slot 38 tabs 39 are provided, one of the tabs serving to detain outward movement of the floating tongue 31 as it is urged in such fashion by spring 33.

From the description of the foregoing apparatus, it can be seen that the turning of screw 22 to cause bar 19 to slidably move from left to right in a direction parallel the longitudinal axis of bar 13 causes ramp 28 of each cam 24 to move against its stop rod 11, thus exerting lateral pressure on bar 19 and in turn against base side 14 of bar 13. This causes movement of bar 13 laterally away from rods 11, the guiding and determination of such movement being controlled by the stop bar and slot coupling 13, 18. The lateral movement of assembly 12 away from rods 11 results in side 14 of bar 13 engaging against the adjacent edges of inserted filter cells to urge such cells into fast sealing contact with sealing gaskets 9 on the peripheral flanges 8. It is to be noted that through springs 33 and ramps 28, a substantially uniform, controlled pressure is applied along the length of the edges of the inserted filter cells by bars 13, notwithstanding the fact that the ramps on a bar might be at slightly different positions in relation to their stop rods. Further, due to the assembly movement limiting devices, the spring and slotted arrangement on the bar, and the detent, overloading pressure is avoided against inserted filter cells.

The invention claimed is:
1. In a flow-through filter cell support housing adapted to receive and support unit filter cell means between the dirty gas inlet and clean gas outlet thereof with the peripheral edge of said filter cell means abutting against a peripheral seal on said support housing; an improved filter cell retaining means comprising: stop means mounted on said support housing in spaced relation from the space to be occupied by said filter cell means; longitudinally extending fastening means positioned between said stop means and the space for said filter cell means, said fastening means including a first longitudinally extending bar member mounted on said support housing for slidable movement in a direction solely lateral to the longitudinal axis of said first bar member; a second longitudinally extending bar member cooperating with said first bar member, said second bar member being mounted between said first bar member and said stop means for slidable movement in a direction parallel to the longitudinal axis of said first bar member; an expansible-compressible cam member cooperatively mounted between said second bar member and said stop means on said housing; and means to actuate said fastening means to slide said second bar member wherein said cam member cooperates with said stop member to laterally urge said second bar member so as to laterally urge said first bar member with the longitudinally extending side of said first bar member engaging against an adjacent peripheral edge of an inserted filter cell to hold said cell in fast sealed relation against said peripheral seal on said support housing.

2. The apparatus of claim 1, said actuating means including an adjustable screw assembly cooperably mounted between said first and second bar members to provide relative slidable movement therebetween along the longitudinal axis thereof.

3. The apparatus of claim 1, said expansible-compressible cam member comprising at least one flexible track including a base section, an inclined ramp section, a dwell section, and a floating tongue section, said base section being fastened to said second longitudinally extending bar member at a position adjacent said stop means on said housing to permit said track to cooperate therewith; spring means positioned between said second bar member and said dwell section of said track; and detent means to restrain said floating tongue section when said cam member is in non-operative position.

4. The apparatus of claim 1, said first bar member having slot means extending transverse the longitudinal axis thereof; said stop means on said support structure comprising a rod member extending through said slot means.

5. The apparatus of claim 1, said first bar member being of U-shaped cross section with the base portion thereof positioned to engage against a peripheral edge of an inserted filter cell; said second bar member being contoured to slidably nest in said first bar member.

References Cited

UNITED STATES PATENTS

| | | | |
|---|---|---|---|
| 2,329,356 | 9/1943 | Moore | 210—493 |
| 2,391,884 | 1/1946 | Orlow | 292—306 |
| 2,460,423 | 2/1949 | Kracklauer | 210—479 |
| 2,907,408 | 10/1959 | Engle et al. | 55—500 |
| 2,966,959 | 1/1961 | Neumann | 55—484 |
| 3,100,557 | 8/1963 | Getzkin | 55—490 |
| 3,118,836 | 1/1964 | Briggs | 210—493 |
| 3,242,656 | 3/1966 | Murphy | 55—500 |
| 3,247,652 | 4/1966 | Annas et al. | 55—483 |

FOREIGN PATENTS 499,914   1/1939   Great Britain.

HARRY B. THORNTON, *Primary Examiner.*

BERNARD NOZICK, *Assistant Examiner.*

U.S. Cl. X.R.

55—502, 504, 499, 500; 210—232, 493; 292—305